Nov. 4, 1958
K. UNDERLAND
2,859,063
VEHICLE SEAT AND MOUNTING
Filed May 20, 1957
2 Sheets-Sheet 1
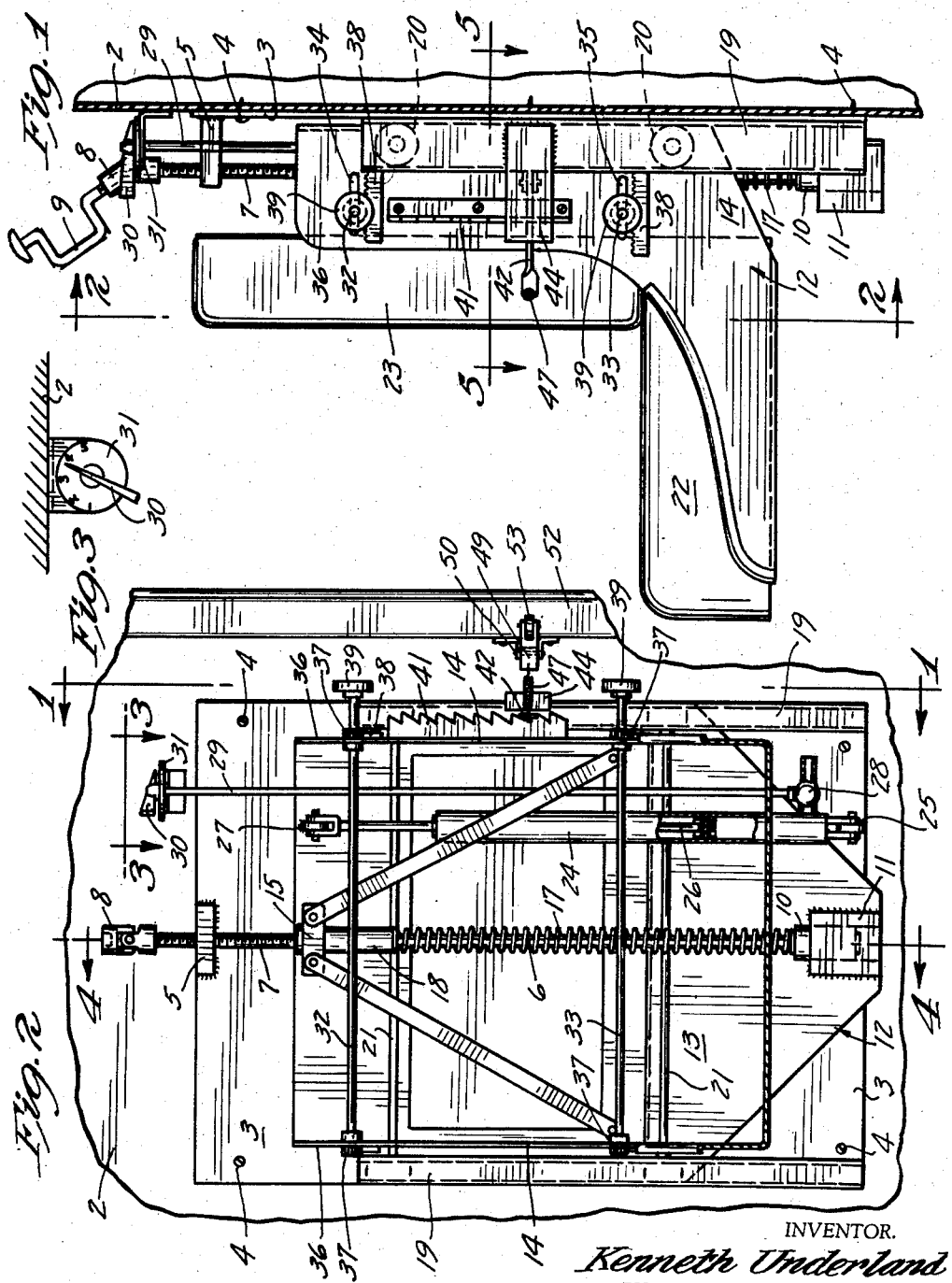
INVENTOR.
Kenneth Underland
BY
Merchant & Merchant
ATTORNEYS Nov. 4, 1958 K. UNDERLAND 2,859,063
VEHICLE SEAT AND MOUNTING
Filed May 20, 1957 2 Sheets-Sheet 2
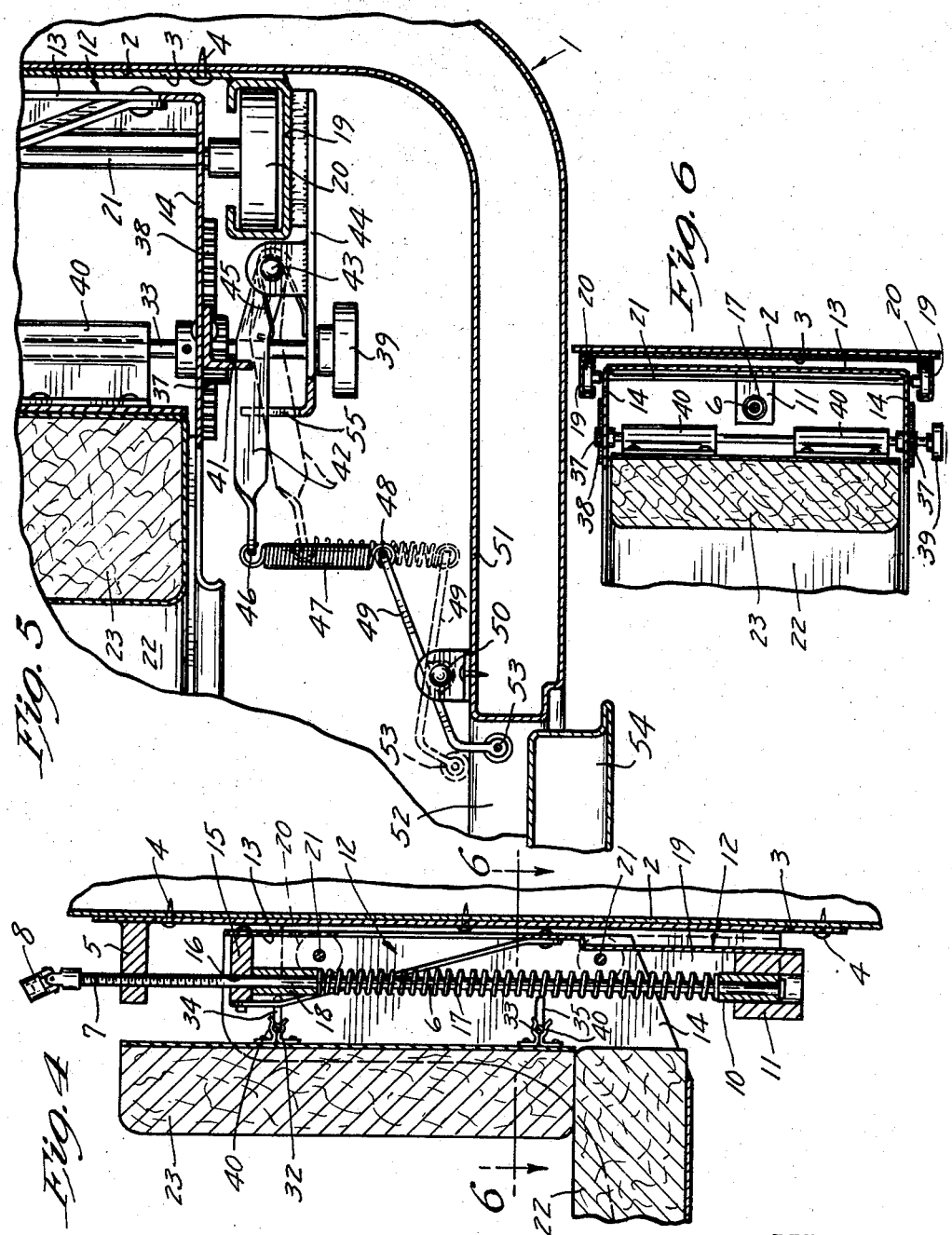
INVENTOR.
Kenneth Underland
BY
Merchant & Merchant
ATTORNEYS

United States Patent Office 2,859,063
Patented Nov. 4, 1958

2,859,063

VEHICLE SEAT AND MOUNTING

Kenneth Underland, Owatonna, Minn., assignor of fifty percent to Raynold F. Kramer, Owatonna, Minn.

Application May 20, 1957, Serial No. 660,192

3 Claims. (Cl. 296—65)

My invention relates generally to seats for automotive vehicles and more particularly to drivers' seats for heavy duty automotive vehicles such as trucks and the like.

Heavy duty high speed trucks are, of necessity, hard riding to assure snug engagement with the road at all times. As a consequence, the drivers of such vehicles, who spend considerable hours each day behind the wheel, are subjected to punishing jolts and shocks which are not only uncomfortable but frequently unhealthy. Furthermore, the springs conventionally found in the seat and back rest cushions are not adequate to overcome the shock and objectionably rough ride afforded by vehicles of this type.

The primary object of my invention is the provision of a seat frame, means mounting and guiding said seat frame to a motor vehicle for movements in a substantially vertical plane, yielding means cushioning downward movements of said seat frame and means for raising and lowering said yielding means without varying the cushioning bias of said yielding means with respect to said seat frame.

A further object of my invention is a device of the class immediately above described in which said mounting and guiding means includes a mounting plate or frame adapted to be secured to the fixed part of a vehicle, a hanger bracket rigidly carried by said mounting frame, a vertically extended hanger rod having screw threaded engagement with said hanger bracket at its upper end, cooperating guides and guide elements carried by said mounting frame and seat frame, a horizontally disposed mounting head carried by said seat frame and having an aperture therein slidably receiving said shaft in downwardly spaced relation to said mounting bracket, and a coil compression spring on said shaft interposed between the lower end thereof and the horizontally disposed mounting head carried by said seat frame.

A still further object of my invention is the provision of a device of the class immediately above described in further combination with independent means for cushioning the rebound exerted by said yielding means upon said seat frame.

A still further object of my invention is the provision of a device of the class above described including a seat frame, means mounting and guiding said seat frame in a door-equipped cab of a motor vehicle for movements in a substantially vertical plane, yielding means cushioning downward movements of said seat frame, means for raising and lowering said yielding means without varying the cushioning bias of said yielding means with respect to said seat frame and means responsive to opening movements of said vehicle cab door for positively locking said seat frame in the position same has been caused to assume by the weight of a given occupant thereon against the bias of said yielding means.

A still further object of my invention is the provision of a device of the class immediately above described in which said door locking mechanism includes a ratchet element on said seat frame and a cooperating pawl mounted on said mounting frame for swinging movements toward and away from engagement with said ratchet element, spring means biasing said pawl element toward engagement with said ratchet element, a reciprocating actuator (preferably the door of said vehicle cab), independent yielding means interposed between said reciprocating actuator and said pawl element responsive to movement of said actuator to the limit of its movement in one direction to overcome said spring means and move said pawl element out of engagement with said ratchet element when the weight of an occupant is applied to said seat, the bias of said independent yielding means being insufficient to overcome the bias of said spring means plus the frictional engagement of said pawl and ratchet elements when the weight of the occupant is removed from said seat.

A still further object of my invention is the provision of a device of the class immediately above described in further combination with a back rest cushion carried by said seat frame and in still further combination with means for imparting forward and rearward adjustments to said cushion.

A still further object of my invention is the provision of a device of the class immediately above described in which the rear surface of said cushion adjacent its upper and lower ends is provided with spring clips, and in which said means for imparting forward and rearward adjustments to said cushion comprises vertically spaced horizontally extended shafts mounted in said seat frame for rotary and forward and rearward movements, pinions carried by said shafts and cooperating horizontally extending racks carried by said seat frame, said spring clips being detachably secured to said shafts.

A still further object of my invention is the provision of a device of the class described which will maintain the driver on independent compressible yielding means, which is free from rebounds of said yielding means, which may be individually adjusted in accordance with the height and weight of the individual driver, and which adjustment will automatically be maintained during opening and closing movements of the door of the cab and removal and reoccupation of the seat frame by the driver.

A further object of my invention is the provision of a device of the class described which is easy to adjust, which provides a maximum of comfort to the drivers and is rugged and durable in construction.

The above and still further objects of my invention will become apparent from the following detailed specification, appended claims, and attached drawings.

Referring to the drawings wherein like characters indicate like parts throughout the several views:

Fig. 1 is a view partly in vertical section and partly in side elevation as seen substantially from the line 1—1 of Fig. 2;

Fig. 2 is a view in front elevation as seen from the line 2—2 of Fig. 1, some parts being broken away;

Fig. 3 is a fragmentary view in side elevation as seen from the line 3—3 of Fig. 2;

Fig. 4 is a vertical section taken on the line 4—4 of Fig. 2;

Fig. 5 is an enlarged fragmentary view in horizontal section as seen substantially from the line 5—5 of Fig. 1; and Fig. 6 is a fragmentary section view taken on the line 6—6 of Fig. 4 on a reduced scale.

Referring with greater particularity to the drawings, the numeral 1 indicates in its entirety the cab body of a conventional motor vehicle, the rear panel thereof being identified by the numeral 2. A mounting plate or flange 3 is detachably secured to the panel 2 by any suitable means such as screws 4.

Rigidly carried by the mounting frame 3 and projecting forwardly thereof is a hanger bracket 5. A vertically extended hanger rod 6 has a screw threaded upper end 7 which has threaded engagement with the hanger bracket 5, as shown particularly in Fig. 4. The extreme upper end of the hanger rod 6 is preferably and as shown provided with a universal joint type socket, wrench-receiving, head 8 for the reception of a suitable tool 9, for a purpose which will hereinafter be explained in greater detail. At its extreme lower end, the hanger rod 6 is provided with an enlarged reactance member 10 which is mounted for vertical sliding movements in a guide sleeve 11 carried by the lower end portion of a seat frame, identified in its entirety by the numeral 12, and comprising a plate-like back member 13 and upstanding side members 14. Rigidly carried by the upper end portion of the plate-like back member 13 of the seat frame 12 and projecting forwardly therefrom is a horizontally disposed mounting head 15 having an aperture 16 therein for the slidable reception of the intermediate portion of the hanger rod 6. As shown particularly in Figs. 2 and 4, a coil compression spring 17 is loosely mounted on the intermediate portion of said hanger rod 6, the lower end thereof abutting against the reactance member 10 and the upper end against the mounting head 15, preferably and as shown through the medium of a sleeve 18.

Mounting and guiding opposite side portions of the seat frame 12 in its raising and lowering movements on the hanger rod 6 are a pair of laterally spaced vertically extended opposed guide channels 19 rigidly secured to and projecting forwardly of the plate-like mounting frame 3, and each of which receives a roller element 20 carried by the projected opposite end portions of a horizontally disposed shaft 21 carried by the seat frame 12.

It should be obvious that a driver or other occupant mounted on the seat frame 12, through the medium of the seat cushion 22 and back rest cushion 23, will depress the coil spring 17 in accordance with the weight exerted thereon. To bring about the proper or desired vertical seating height of the driver with respect to the steering wheel of the vehicle, the hanger rod 6 is raised or lowered with respect to the mounting bracket 5 by rotating same through the medium of the tool 9. As a result, under all conditions of adjustment, the seat frame 12 is mounted on shock eliminating compressible yielding means, any possibly objectionable rebound effect of which is eliminated through the medium of a conventional piston-equipped air cylinder 24 secured at one end to the mounting frame, as indicated at 25, the piston of said cylinder being connected to a piston rod 26 that is connected to the seat frame 12, as indicated at 27. For the purpose of adjusting the dampening effect of cylinder-piston 24, 26, I provide a valve 28 which is adjusted through the medium of a rod or stem 29 terminating at its upper free end and a handle 30 which, preferably and as shown, is in the nature of an indicator adapted to cooperate with a conventional dial 31.

To impart forward and rearward adjustments to the back rest cushion 23, or alternately to either the upper or lower end thereof, I provide a pair of vertically spaced horizontally extended upper and lower shafts 32 and 33 respectively which have their opposite ends rotatably received within horizontally extended slots 34 and 35 respectively in the side members 14 of the seat frame 12. Fast on the opposite end portions of the shafts 32, 33, and as shown particularly in Fig. 2, in snug engagement with the outer surfaces 36 of the side frame members 14 of the seat frame 12, are pinions, all identified by the numeral 37, and each of which is adapted to cooperate with a different horizontally disposed rack 38 one each immediately below one of the slots 34. Turning knobs 39 are provided to facilitate turning of the shafts 32, 33. Secured to the back rest cushion 23 are cooperating pairs of transversely elongated spring clips 40 which are adapted to detachably be received upon the rotary shafts 32, 33.

For the purpose of automatically locking the seat frame 12 in the vertical position which it has been caused to assume (both as a result of manual adjustment of the hanger rod 6 with respect to the hanger bracket 5, as well as the weight exerted by the driver upon the coil compression spring 17), during removal of the driver from the seat, I provide a vertically disposed ratchet element 41 which is secured to one side member 14 of the seat frame 12 and carried thereby. Adapted to cooperate with the vertically disposed ratchet element 41 is an elongated horizontally disposed pawl element 42 which has one end pivotally secured, as at 43, to the intermediate portion of an L-shaped mounting bracket 44 carried by the mounting frame 3. A torsion spring 45 yieldingly biases the intermediate portion of the pawl element 42 toward engagement with the ratchet element 41. The free forward end of the pawl element 42 is apertured to receive the looped end 46 of a coil tension spring 47. The opposite looped end 48 of the spring 47 is received within one apertured end of a horizontally disposed operating lever 49, the intermediate portion of which is pivotally secured as at 50 to the interior side portion 51 of the cab 1 in close proximity to the door opening 52 thereof. The projected forward free end 53 of the operating lever 49 is bent laterally outwardly to be intercepted by a conventional hinged door 54 of the cab 1 during final closing movements thereof. Under this arrangement, the door 54 acts in the nature of a reciprocating actuator for the lever 49. Preferably and as shown, the inturned free end of the L-shaped mounting bracket 44 is forked as at 55 for the reception of the intermediate portion of the pawl element 42 forwardly of the ratchet element 41, whereby to positively limit outward movements of the pawl element 42 as well as vertical movements thereof.

It is important to note that the bias exerted by the coil spring 47 upon the pawl element 42 during final closing movements of the door 54 is greater than that constantly exerted upon the pawl element 42 by the torsion spring 45 in the direction of the ratchet element 41. However, the bias exerted by the coil spring 47 upon the pawl element 42 during door closing movements is insufficient to overcome the bias of the torsion spring 45 plus the frictional engagement between the pawl and ratchet elements 42, 41. In light of this novel arrangement, the following highly desirable results take place. When the vehicle driver opens the door 54 of the vehicle cab 1 and absents himself from the seat frame 12, the operating lever 49 and spring 47 take the full line position of Fig. 5 due to bias exerted by the torsion spring 45, whereby to automatically lock the seat frame 12 in a given adjusted and desirable position. Thereafter, the pawl element 42 will not be swung to the inoperative dotted position of Fig. 5 until the driver again applies his weight to the seat frame 12 and closes the door 54. In other words, opening and closing of the door, in the absence of the driver on the seat cushion 22, will not disengage the pawl element 42 from its cooperating ratchet element 41.

My invention has been thoroughly tested and found to be completely satisfactory for the accomplishment of the above objects, and while I have shown a preferred embodiment thereof, it should be obvious that same is capable of modification without departure from the scope and spirit of the appended claims.

What I claim is:

1. In a device of the class described, a seat frame, means for mounting and guiding said seat frame in a door equipped cab of a motor vehicle for movements in a substantially vertical plane, yielding means cushioning downward movement of said seat frame, cooperating pawl and ratchet elements one operatively connected to said seat frame for common movements therewith and the other operatively connected to the seat frame mounting means, one of said elements being movable toward and away from the other thereof, second yielding means urging said one of the elements toward engagement with the other thereof, and mechanism including an actuator operatively connected to said one of the elements and engaged by the cab door when the same is closed to move said one of the elements away from engagement with the other thereof against bias of said second yielding means, said actuator releasing said one of the elements for engagement with the other thereof upon opening movements of said door to positively lock said seat frame in the position the same has been caused to assume by the weight of a given occupant thereon against the bias of said first mentioned yielding means.

2. The structure defined in claim 1 in which said ratchet element is mounted on said seat frame for common movements therewith, said pawl element being mounted on said seat frame mounting means, said last-mentioned mechanism further including a spring intermediate said actuator and said pawl element, said spring being placed under sufficient tension when said door is closed to overcome the bias of said second yielding means to retain said pawl element out of engagement with said ratchet element.

3. The structure defined in claim 2 in which said actuator comprises a lever pivotally mounted in said cab adjacent the door opening and connected to said spring, said lever having a portion extending into the door opening and engaged by said door during final closing movements thereof.

References Cited in the file of this patent
UNITED STATES PATENTS

| | | |
|---|---|---|
| 2,608,239 | Gorden | Aug. 26, 1952 |
| 2,680,472 | Hempe | June 8, 1954 |